US006994934B2

(12) United States Patent
Stanish et al.

(10) Patent No.: US 6,994,934 B2
(45) Date of Patent: Feb. 7, 2006

(54) BIOBASED MICROBATTERY

(75) Inventors: Ivan Stanish, Alexandria, VA (US); Alok Singh, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 114 days.

(21) Appl. No.: 10/644,558

(22) Filed: Aug. 19, 2003

(65) Prior Publication Data

US 2004/0038128 A1 Feb. 26, 2004

Related U.S. Application Data

(63) Continuation-in-part of application No. 09/939,288, filed on Aug. 24, 2001, now Pat. No. 6,680,142.

(51) Int. Cl.
*H01M 4/60* (2006.01)

(52) U.S. Cl. ........................................ 429/213; 429/245
(58) Field of Classification Search ................. 429/213, 429/245, 255, 140, 2, 212, 26; 427/58
See application file for complete search history.

(56) References Cited

U.S. PATENT DOCUMENTS 5,405,594 A * 4/1995 Andersen et al. ........... 429/224

* cited by examiner

*Primary Examiner*—Michael Barr
*Assistant Examiner*—Monique Wills
(74) *Attorney, Agent, or Firm*—John K. Karasek; Joseph T. Grunkemeyer

(57) ABSTRACT

A galvanic cell having a cathode, an anode, and an electrolyte. The cathode and anode each have vesicles, an electroactive species encapsulated into the vesicles, a conducting substrate, and functionalized tethers immobilizing the vesicles to the substrates. The electrolyte is in contact with both conducting substrates. At least some of the vesicles contain benzoquinone and/or hydroquinone.

26 Claims, 7 Drawing Sheets

BIOBASED MICROBATTERY

This application is a continuation-in-part application of pending U.S. patent application Ser. No. 09/939,288, filed on Aug. 24, 2001 now U.S. Pat. No. 6,689,142, incorporated herein by reference.

BACKGROUND OF THE INVENTION

1. Field of the Invention

The present invention relates generally to microbatteries and methods for making same, more specifically to biobased microbatteries and methods for making same.

2. Description of the Prior Art

Currently, numerous types of battery designs have been commercialized, resulting from application-based niches dependent on size, power, energy, convenience, and marketability. Unfortunately, batteries suffer from one or more of the following traits: toxicity, flammability, explosivity, low energy density, low discharge rate, instability, expensive material use, high fabrication costs, short cycle life, production complexity, and excessive design precautions. The major concerns are eliminating toxic components and fabricating devices on a smaller size scale.

With regards to environmental issues, 85% of the mercury (a highly toxic metal) found in New York's solid waste in 1996 was attributed to mercury batteries and in 1991, household batteries measured by weight were the second most common source of toxins in US landfills. The need to curb battery toxicity in the environment led to congressional action, such as enacting The Battery Act of 1996 to phase out the use of mercury in batteries and the Implementation of the Mercury-Containing and Rechargeable Battery Management Act of 1997 to provide for the efficient and cost-effective collection, recycling, and disposal of used nickel-cadmium batteries, small sealed lead-acid batteries, and other batteries deemed toxic under the purview of this act. (See http://www.epa.gov/compliance/civil/programs/ba/.) There is a need for batteries engineered and composed of materials that can significantly reduce device toxicity as opposed to that observed with conventional batteries.

SUMMARY OF THE INVENTION

The invention comprises a galvanic cell comprising a cathode, an anode, and an electrolyte. The cathode comprises a first vesicle, an electron acceptor species encapsulated into the first vesicle, a first conducting substrate, and a first functionalized tether immobilizing the first vesicle to the first substrate. The anode comprises a second vesicle, an electron donor species encapsulated into the second vesicle, a second conducting substrate, and a second functionalized tether immobilizing the second vesicle to the second substrate. The electrolyte is in contact with both the first conducting substrate and the second conducting substrate. The first vesicle, the second vesicle, or both comprise benzoquinone and/or hydroquinone.

DETAILED DESCRIPTION OF THE EXAMPLE EMBODIMENTS

The present invention provides for materials and methods for battery design by exploiting highly efficient modes of energy transduction and storage found in natural systems. The aim is optimize and maximize system performance in relation to energetic, economic, ergonomic, and environmental aspects. In one embodiment, the electrodes comprise immobilized electroactive polymerized vesicles (submicron spherical capsules composed of amphiphilic surfactants) chemisorbed onto a thin conducting gold film. Water-soluble reductants at the anode and oxidants at the cathode are encapsulated within these vesicles to produce the desired voltage. Current flows from the anode to the cathodic electrode, but not before passing through a load. The separator of the battery is an ultra thin phospholipid bilayer membrane of approximately 5 nm. This design allows for easily tunable voltages and currents and efficient use of space, weight, and energy conversion.

The advantage of this system is its design and size. Coupled immobilized polymerized electroactive vesicles (CIPEVs) are designed based on the consolidation of several scientific disciplines (i.e., bioorganic synthesis, bioelectrochemistry, colloidal chemistry, membrane transport, and surface science relevant to "soft" materials). CIPEVs can range anywhere from 25 nm to 250 μm in diameter with a wall thickness of ~5 nm. CIPEVs can be easily, quickly, and cheaply prepared for a number of surfaces. CIPEVs allow the ability to provide for a localized power source, relevant for future nanoelectromechanical systems and devices.

With regards to system size, the present invention is intended to deliver power locally for nanoscopic, and microscopic devices where conventional technologies falter. For instance, conventional computer circuitries employ transformers for stepping-down currents and voltages in order to prevent power overload of the smaller, local electronic units. The ability to do away with excess transformers will obviously conserve system (i.e., battery) space and weight. Furthermore, due to the environmentally benign material composition of the present invention, disposal of the miniaturized batteries will not require elaborate monitoring or processing of hazardous waste. The present invention with such small dimensions can overcome issues of convenience and allow for the construction of less conspicuous devices.

Figure 1:
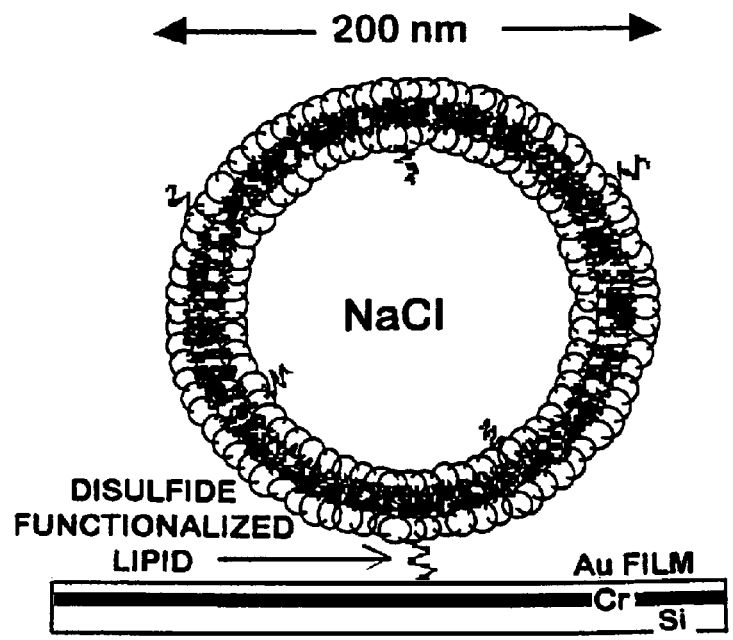
FIG. 1 is a schematic depiction of a unilamellar, polymerized vesicle immobilized to a conducting substrate.
Figure 2:
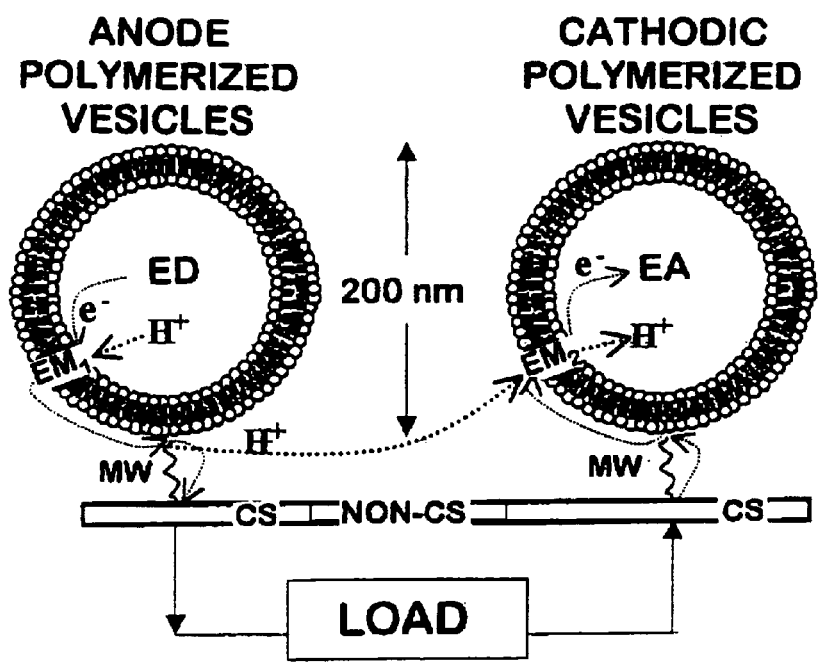
FIG. 2 is a schematic depiction of the bio-based microbattery.

The present invention includes materials and methods to increase the power/energy content of present-day batteries through efficient use of space and conversion of energy, while eliminating system toxicity. The novel bioelectrochemical architecture of this system builds from the molecular and supramolecular scale, exploiting tools from the fields of nano- and colloidal science. The key element that determines battery performance can be pinpointed to the electrode. Electrode design and the available fabrication technology will determine the extent of its efficiency, stability, energy-content, and toxicity. FIG. 1 is a schematic depiction of a unilamellar, polymerized vesicle immobilized to a conducting substrate. The substrate comprises a silicon oxide substrate with coatings of chromium and gold. The vesicle is tethered to the substrate. A design schematic of the present invention is depicted in FIG. 2, represented as a galvanic cell. The system electrode is divided into three components: a conducting thin film (i.e., 25 nm Au) that can range from 0.5–100 nm, a molecular wire, and stable, electroactive phospholipid vesicles. At the cathode, chemisorbed polymerized phospholipid vesicles contain an electron acceptor, which can be at submolar levels, or 1 M and higher. At the anode, chemisorbed polymerized phospholipid vesicles contain an electron donor at a concentration with electron equivalents close to that of the electron acceptor. Since these vesicles are impervious to water-soluble reductants/oxidants, electrons and hydrogen ions rapidly cross the vesicle membranes, which may range in thickness from 1–20 nm, via a lipophilic electron mediator. Electrons then travel through a molecular wire, which anchors the vesicle to the surface, and subsequently are shunted through a load to perform work as they flow from the anode to the cathode.

Figure 3:
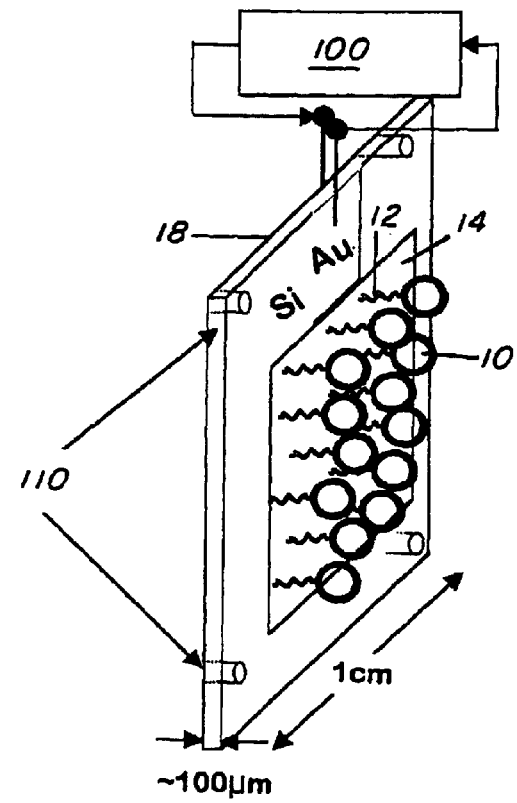
FIG. 3 is a schematic depiction of a bio-based submicron galvanic cell using a conductive thin film coated glass substrate.

FIG. 3 is a schematic, not to scale representation of a bio-based submicron galvanic cell. Vesicles 10, encapsulating electroactive species of differing redox potential, are immobilized via thiolate linkage 12 on a conducting gold substrate 14 that has been selectively electrodeposited on both sides of a glass slide 18. Electrons flow through a load 100 from high to low reducing potential. Openings 110 allow for $H^+$ flow in order to maintain electrical neutrality. Thousands of these vesicle-based galvanic plates could be connected in parallel or in series to produce miniature high charge capacity or high current battery devices.

Figure 4:
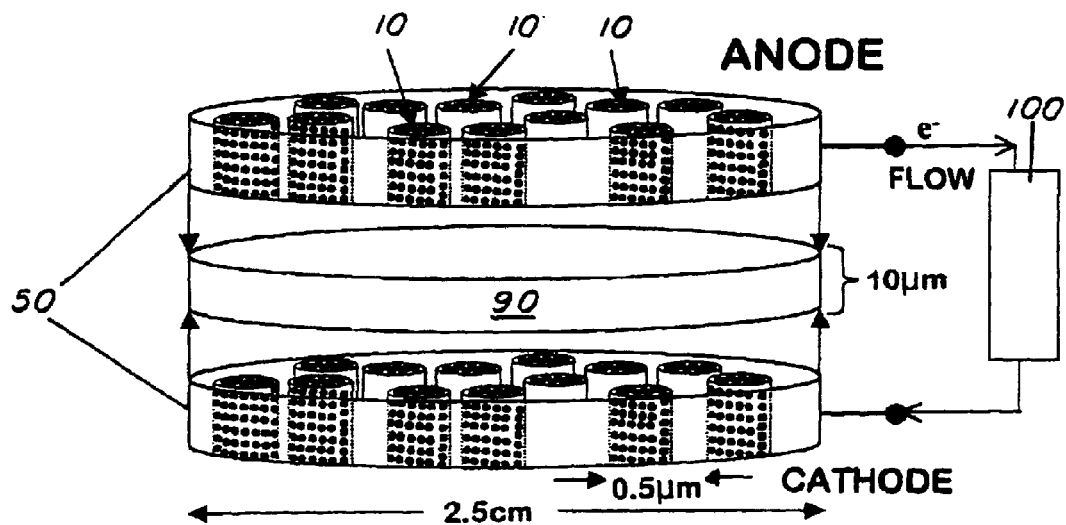
FIG. 4 is a schematic depiction of a bio-based submicron galvanic cell using a porous conducting polymer substrate.

FIG. 4 shows a schematic, not to scale, bio-based microbattery using a porous conducting polymer substrate 50. Vesicles 10 are immobilized on the porous conducting polymer substrate 50. The vesicles 10, encasing electroactive species of differing redox potentials, are separately immobilized on a pair of porous conducting substrates 50. A semipermeable insulator 90, which may or may not be necessary, separates the porous conducting substrates 50. The electrons flow through a load 100 from high to low reducing potential. The porous conducting polymer substrates provide for a greater exposed surface area, increased flexibility, reduced system weight, and increased specific energy density. Thousands of these vesicle-based galvanic plates could be connected in parallel or in series to produce miniature high charge capacity or high current battery devices.

Although a potential of 1.23 V is the thermodynamic limit obtainable for aqueous systems, this value can be increased under basic conditions. It is estimated that a 1 L system housed in a highly porous conductive media, can reach charge capacities of ~500 A-hr for entrapment of a three electron equivalent specie at 6 M. With this system, the specific energy achieved theoretically for one cycle can reach ~369 W-hr/kg, which competes effectively with the currently leading market batteries. The present invention makes efficient use of space, energy conversion (i.e., low ohmic loss and low concentration polarization effects), and provides for an alternative approach with respect to design and synthesis of environmentally safe batteries.

The first and second vesicles can be comprised of phospholipids, quaternary amine surfactants, or other suitable vesicle forming amphiphiles. Specifically, the polymerized vesicle can be made from phospholipids having an ether, ester, or amide-linked backbone. The phospholipids can further include a polymerizable functionality such as a vinyl, acetylenic, methacryl, acryl, styryl, diacetylenic, sulfhydryl, disulfide, and dienoates, which can be located in the head-group, tail, or interfacial region of the phospholipid. The vesicles may be polymerized through the polymerizable functionality.

Glycerophospocholines are suitable vesicle forming compounds. Examples include 1,2-bis (alkadiynoyl)-sn-glycero-3-phosphocholines ($DC_{m,n}PC$) or acetylene terminated phospholipids, which may by synthesized by a method reported by Stanish and Singh., "Highly stable vesicles composed of a new chain-terminus acetylene photopolymeric phospholipid," *Chem. and Phys. of Lipids*, 112 (2001), 99–108, incorporated herein by reference.

Examples of electron donor species are riboflavin, ascorbic acid, and ferrocyanide. Examples of electron acceptor species are ferricyanide, superferrioxide, ferri chelates, and manganese chelates. The electron acceptor species can comprise a metal ion coordinated with a chelating agent such as glutamate, ethylenediamine tetraacetic acid, or citrates.

The first and second vesicles can comprise an electron mediator such as benzoquinone, vitamin K, ubiquinone, anthroquinone, ferrocene, and caroviolegen. Alternatively, the first and second vesicles may comprise an organic cationic carrier such as nigericin, monensin, gramicidin, lasalocid, calcimycin, and ionomycin.

The first and second conducting substrates can be a metal, polymer, or alloy. Specifically, the substrates can be gold, silver, palladium, platinum, rhodium, tin, polypyrrole, polyaniline, and indium titanium oxide.

The first and second functionalized tethers can be comprised of a saturated aliphatic, such as ethyl, propyl, butyl, pentyl, and hexyl. Alternatively, the tethers can be comprised of a conjugated polyene, non-conjugated polyene, polyacetylene, or polyphenylacetylene. The tether may comprise a terminal functional group for non-covalent or covalent substrate binding, such as sulfhydryl, disulfide, amide, ester, and isocyanate. The tether may be part of a compound chemically similar to the vesicle compound, such as 1,2-bis (tricosa-10,12-diynoyl)-sn-3-glycerophospho-2-[(2-hydroxyethyl) disulfanyl)] ethanol ($DC_{8,9}PDSEtOH$) or N-3-(pyridyl-2-dithio)-propionyl-2-bis(10,12-tricosadiynoyl)-sn-glycero-3-phosphatidyethanolamine ($PDP-DC_{8,9}PE$).

Figure 9:
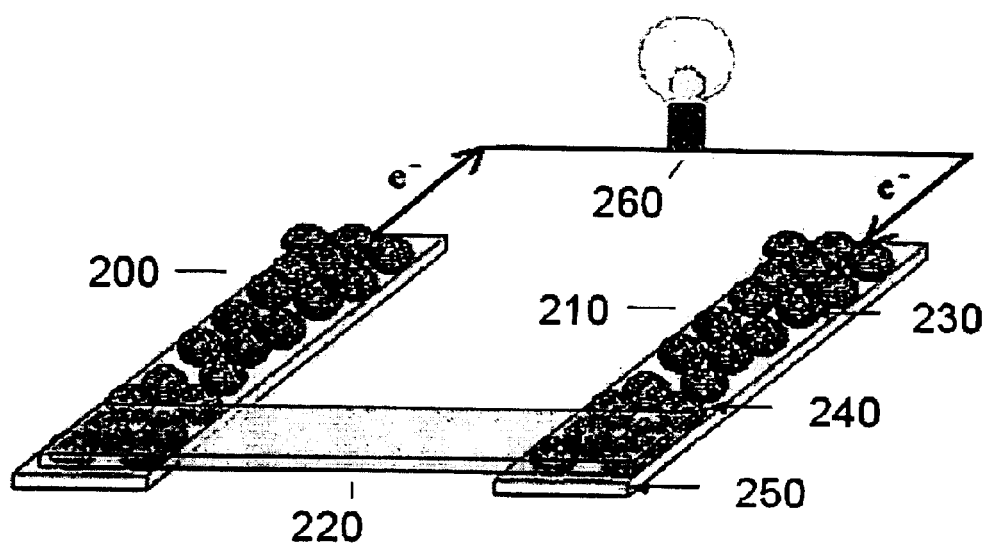
FIG. 9 shows a schematic prototype of a battery system.

The electrolyte can comprise a salt bridge. The first and second conducting substrates can be connected to power a voltage sensitive fluorescent dye so as to mimic an LED. These features are schematically illustrated in FIG. 9. The anode 200 and cathode 210 are connected by a salt bridge 220. Both electrodes have 200 nm vesicles 230 immobilized on 50 nm Au 240 coated on 1 MM $SiO_2$ 250. The device powers the fluorescence dye or LED 260. A device may also be made by connecting at least two of the galvanic cells, either in series or in parallel, or three or more cells in series and parallel.

Having described the invention, the following examples are given to illustrate specific applications of the invention, including the best mode now known to perform the invention. These specific examples are not intended to limit the scope of the invention described in this application.

EXAMPLE 1a

Vesicle formation—25 mg of $DC_{8,9}PC$ was placed in a scintillation vial and dispersed with 5 mL of deionized water. The sample was vortexed for 1 minute, heated to 50° C. for 2 hours, and subsequently extruded 10 times through 0.2 $\mu$m Nucleopore membranes using a Lipex extruder (Lipex Biomembranes Inc., Vancouver BC). The sample was UV-irradiated for 10 minutes at 8° C. using a Rayonett Photochemical reactor (So. New England Ultraviolet Co., Hamden, Conn.). Polymerized vesicle average size (~200 nm), shape (spherical), and lamellarity (uni-) were determined by dynamic laser light scattering using a Coulter Model N4MD (Coulter Electronic, In., Miami, Fla.) and/or by a Zeiss transmission electron microscopy (TEM) or by an 8100 Hitachi high resolution TEM.

EXAMPLE 1b

Vesicle formation—25 mg of 1-palmitoyl-2-(tricosa-10, 12-diynoyl)-sn-glycero-3-phosphocholine $PC_{8,9}PC$ was placed in a scintillation vial and dispersed with 5 mL of deionized water. The sample was vortexed for 1 minute, heated to 50° C. for 2 hours, and subsequently extruded 10 times through 0.2 $\mu$m Nucleopore membranes. The sample was UV-irradiated for 10 minutes at 8° C. Polymerized vesicle average size (~200 nm), shape (spherical), and lamellarity (uni-) were determined by dynamic laser light scattering and/or by TEM.

EXAMPLE 1c

Vesicle formation—25 mg of $DC_{10}PC$ was placed in a scintillation vial and dispersed with 5 mL of deuterated water. The sample was vortexed for 1 minute, heated to 50° C. for 2 hours, and subsequently extruded 10 times through 0.2 $\mu$m Nucleopore membranes. The sample was exposed to 10 megaradians of $\gamma$-radiation using a $^{60}Co$ source. Polymerized vesicle average size (~130 nm), shape (spherical), and lamellarity (uni-) were determined by dynamic laser light scattering and/or by TEM.

Example 2a

Functionalized vesicle formation—25 mg of $DC_{8,9}PC$ dissolved in chloroform and 0.26 mL of $DC_{8,9}PDSEtOH$ dissolved in chloroform at 1 mg/mL were placed in a round bottom flask, dried, and re-dispersed in 5 mL of deionized water. The sample was vortexed for 1 minute, heated to 50° C. for 2 hours, and subsequently extruded 10 times through 0.2 $\mu$m Nucleopore membranes. The sample was UV-irradiated for 10 minutes at 8° C. Polymerized vesicle average size (~200 nm), shape (spherical), and lamellarity (uni-) were determined by dynamic laser light scattering and/or by TEM.

EXAMPLE 2b

Preparation of polymerized electroactive vesicles (PEVs)—10 mL of $CHCl_3$ was added to a round-bottom flask containing dried $DC_{8,9}PC$ lipids (25 mg, 27.3 $\mu$mol) and 100 $\mu$L of 9.36 mM $PDP-DC_{8,9}PE$ dissolved in $CHCl_3$ (1.04 mg, 0.936 $\mu$mol), evaporated under reduced pressure, and subsequently dried under high vacuum for 2 hr. A dispersion (5 mL) of vesicles in 1 mM $K_3Fe(CN)_6$ consisting of $DC_{8,9}PC$ at 5 mg/mL doped at three mole percent with $PDP-DC_{8,9}PE$ was incubated at 50° C. and sporadically vortexed for 3 hr (in the dark, under $N_2$) and then extruded ten times at 50° C. through a 0.6 $\mu$m and then through a 0.2 $\mu$m Nucleopore membrane. Extravesicular ferricyanide was removed by anion exchange chromatography (Amberlite, 1. 1×12 cm column height) using 2 mM KCl as the mobile phase. Eluted vesicles were rapidly cooled to 3.8° C. for 10 sec, then immediately photopolymerized by irradiation at 254 nm for 3 min in a Rayonet Photochemical reactor equipped with sixteen 35 W Hg lamps. Stained vesicles were examined using a Zeiss EM-10 TEM to determine vesicle size shape, and lamellarity. One drop of vesicle dispersion was added to the copper side of a carbon-copper grid and then one drop of 1% w/w uranyl acetate was added for 3 min and then wicked away using a chem-wipe. A TEM micrograph showed a cross-section of polymerized vesicle structural features. Vesicles that encapsulated ferricyanide at 1 mM were submicron in size and unilamellar (i.e., one bilayer membrane). Typical vesicle sizes were 144 nm±55 nm as measured by TEM.

EXAMPLE 3a

Attachment of functionalized polymerized vesicles to conducting substrate—Glass substrates coated with gold films were allowed to incubate at room temperature for at least one hour in a suspension of disulfide-functionalized, polymerized vesicles (refer to Example 2) and the vesicle films were characterized by in situ atomic force microscopy (AFM). Relative to bare gold surfaces, polymerized vesicles chemisorbed onto gold films presented a surface roughness of 83 nm and a depth height determined by scribing of 181 nm (i.e., congruent to the vesicle diameter). Gold thin films were deposited using an Edwards Auto306 thermal evaporator (Edwards High Vacuum, West Sussex, UK) onto a clean pre-cut 1 $cm^2$ glass slide affixed with epoxy onto a 1.2 cm stainless steel disk. A 15 nm precursor film of chromium metal was deposited onto the glass slide for subsequent binding of a 25 nm gold film. AFM scans were acquired in contact mode using an Explorer AFM (Topometrix, Sunnyvale, Calif.).

EXAMPLE 3b

Attachment of functionalized polymerized vesicles to conducting substrate—Polymerized vesicles immobilized onto gold films (refer to Example 3a) were imaged in situ using environmental scanning electron microscopy (ESEM) using a 20 keV electron source beam and an environmental secondary electron detector with the sample chamber temperature and pressure established at 23° C. and 4.4 Torr, respectively. Vesicle size (~200 nm) and shape (spherical) were retained when exposed to a smooth gold surface as was apparent visually.

EXAMPLE 3c

Figure 6:
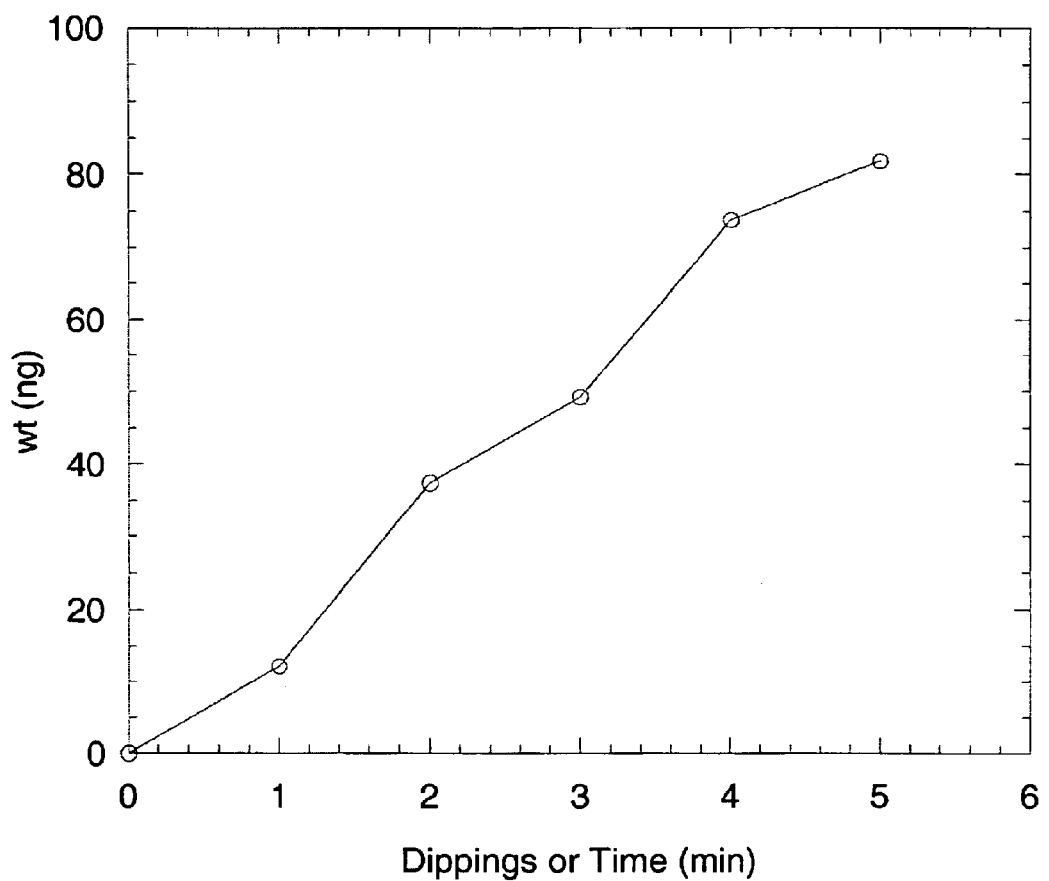
FIG. 6 shows the weight increase corresponding to the deposition of polymerized vesicles that contain 1 mM $K_3Fe(CN)_6$ monitored using a quartz crystal microbalance.

Immobilized polymerized electroactive vesicles (IPEVs)—Subsequent to immobilization, vesicles from Example 2b were evaluated for their structural properties on gold-coated surfaces. A model USI-100 quartz crystal microbalance (QCM, Sanwa Tsusho Co., Tokyo, Japan) linked with a Hewlett-Packard 53131A, 225 MHz universal counter was used. Measurements were carried out using 0.340" diameter gold plated crystals having a fundamental frequency of 9 MHz. The procedure used for vesicle deposition was the following: a 30 $\mu$L aliquot of vesicle dispersion was placed on a QCM resonator for typically minutes, rinsed with water, and then dried with a stream of $N_2$. IPEVs were addressed by measuring a weight increase using a quartz crystal microbalance (QCM). FIG. 6 illustrates the weight increase indicative of vesicle immobilization as a function of the number of vesicle dippings, each for one minute. A frequency change was monitored and converted to adsorbed mass according to the well-known Sauerbrey equation.

EXAMPLE 4a

Polymerized vesicle retention of electroactive material—100 mg of $PC_{8,9}PC$ was placed in a scintillation vial and dispersed with 5 mL of 0.1 M potassium ferricyanide ($K_3Fe(CN)_6$). The sample was vortexed for 1 minute, heated to 50° C. for 2 hours, and subsequently extruded 10 times through 0.2 μm Nucleopore membranes. Extravesicular ferricyanide was removed by anion exchange chromatography using amberlite IRA (Sigma Chemical Co.) with 0.1 M sodium chloride (NaCl) as the mobile phase. After cooling to 7° C., the sample was UV-irradiated for 15 minutes. Polymerized vesicle average size (~200 nm), shape (spherical), and lamellarity (uni-) were determined by dynamic laser light scattering and/or by TEM. These vesicles retained and isolated entrapped ferricyanide under electrochemically stressful conditions. An applied potential in excess of several hundred millivolts beyond the formal reduction/oxidation (redox) potential of ferricyanide did not produce any signal (i.e., current), unless the vesicles were disrupted by addition of 200 mg n-octyl-β-D-glucopyranoside (OG, Biosynth A.-G., Switzerland) thereby releasing entrapped ferricyanide. Electrochemical measurements were performed with a CV-50W voltammetric analyzer (Bioanalytical Systems) using a clean bare gold electrode, a Pt-coated Nb wire, and a Ag/AgCl, saturated KCl electrode as the working, counter, and reference electrodes, respectively. The experimental sample consisted of a 2 mL dispersion of polymerized vesicles and aqueous buffer (10 mM sodium hydrogen phosphate and 100 mM NaCl) at pH 7 and 25° C. Note that the aqueous buffer is not electroactive under the aforementioned experimental conditions.

EXAMPLE 4b

Encapsulation of electroactive material in IPEV systems—Gold disk working electrodes (WE) were modified with an immobilized layer of polymerized vesicles with entrapped 1 mM ferricyanide solution. A 30 μL aliquot of vesicle dispersion was placed on a clean gold disc WE for 40 min, then thoroughly rinsed with water. The experimental setup consisted of a gold disk WE, a Pt-coated Nb wire counter electrode (CE, BAS), and a homemade miniaturized reference electrode (MRE). The MRE was based on a Ag/AgCl internal reference element immersed in an acrylic hydrogel matrix, which contained tetramethylammonium chloride. The formal potential of the MRE was −0.040±0.002 V vs. Ag/AgCl, sat. KCl double junction reference electrode (Orion model 90-02, Beverly, Mass.). The supporting electrolyte (4 mM ammonium phosphate buffer, pH 7) was dropped directly onto the surface of the gold disk so that the electrode, CE, and MRE were immersed in the same droplet. This system allowed for performing reproducible electrochemical experiments in 30 μL of electrolyte. Electroanalytical measurements were performed with a Model 660 electrochemical workstation (CH Instruments, Austin, Tex.) equipped with a Faraday cage. Cyclic voltammetry (CV) was recorded in the potential range from 0.050 to 0.500 V vs. MRE at a typical scan rate of 10 mV s$^{-1}$. At the end of each experiment, the ferricyanide vesicle content was released by pre-electrolysis performed at −800 mV vs. MRE for 10 s. Then, the system was analyzed by additional CV scans.

Figure 7:
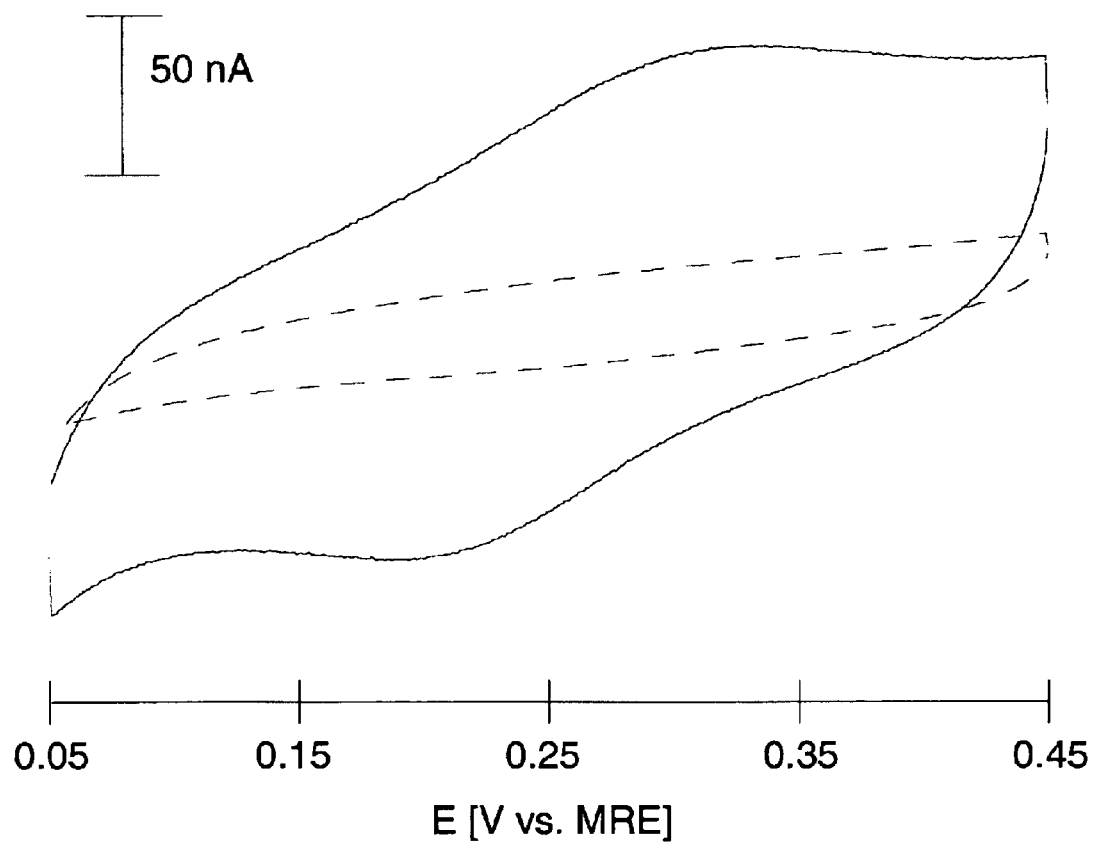
FIG. 7 shows a cyclic voltammogram of polymerized vesicles containing 1 mM $K_3Fe(CN)_6$.

IPEVs on gold electrodes were evaluated for their electrochemical properties using cyclic voltammetry. IPEVs were capable of storing charge (i.e., ferricyanide at 1 mM) and insulating entrapped ferricyanide from electrical potentials applied by the electrode. FIG. 7 demonstrates this phenomenon. The inner curve illustrates that vesicles were immobilized on the electrode due to charging current suppression and that ferricyanide was isolated from the electrode due to a lack of faradaic activity. The outer curve illustrates that ferricyanide was entrapped within the vesicles due to the half-wave potential of ferricyanide expected at 0.245 V vs MRE. Ferricyanide was detected here because the structures were intentionally ruptured due to high applied electrical potentials.

EXAMPLE 5a

Electron transport across polymerized vesicle membranes—0.5 mL of polymerized vesicles encapsulating 0.1 M $K_3Fe(CN)_6$, (refer to Example 4) and 2.5 mL of aqueous buffer (refer to Example 4) were mixed in a 4 mL quartz cuvette in addition to having 32 μM benzoquinone and 2.3 μM monensin, and 166 μM ascorbic acid on a total reservoir volume basis. Electron reduction dynamics (see FIG. 4) were monitored spectrophotometrically at 420 nm at pH 7, 25° C., and 1 atm. using a UV-Visible Cary 4G spectrophotometer. For this sample, the initial electron transport rate and charge capacity was 0.26 μM/s and 0.4 μmols, respectively. Obviously, many modifications and variations of the present invention are possible in light of the above teachings. It is therefore to be understood that, within the scope of the appended claims, the invention may be practiced otherwise than as specifically described.

EXAMPLE 5b

Electron-mediated transport in IPEV systems—For detailed methods refer to Example 4b. Nanomolar concentrations of benzoquinone (BQ) and monensin were added externally and new CVs were recorded accordingly. Concentrations were calculated based on sample reservoir volume.

Figure 8A:
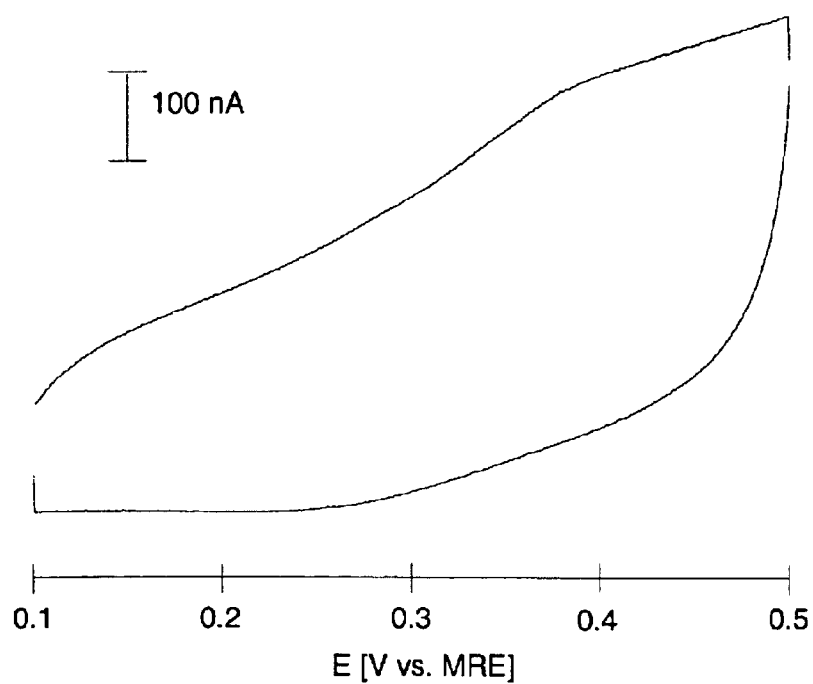
FIG. 8A shows a cyclic voltammogram of polymerized vesicles containing 1 mM $K_3Fe(CN)_6$ and benzoquinone.

In FIG. 8A (inner curve), IPEVs conducted due to the incorporation of benzoquinone (BQ) as the electron/proton mediator. At 250 nM BQ and 250 nM monensin, a faradaic signal was observed having a peak potential at 0.384 V vs. MRE. There was no ferricyanide observed near 0.245 V. Furthermore, background subtracted scans (not shown) clearly showed the presence of ferricyanide released post electrolysis at −0.800 V vs. MRE. Electron mediated transport is evidenced in FIG. 8A since, in the absence of entrapped ferricyanide (i.e., a control study), the BQ faradaic signal was significantly less (i.e., the extra charge transferred would otherwise be compensated by entrapped ferricyanide; refer to FIG. 8B in Example 5c).

EXAMPLE 5c

Figure 8B:
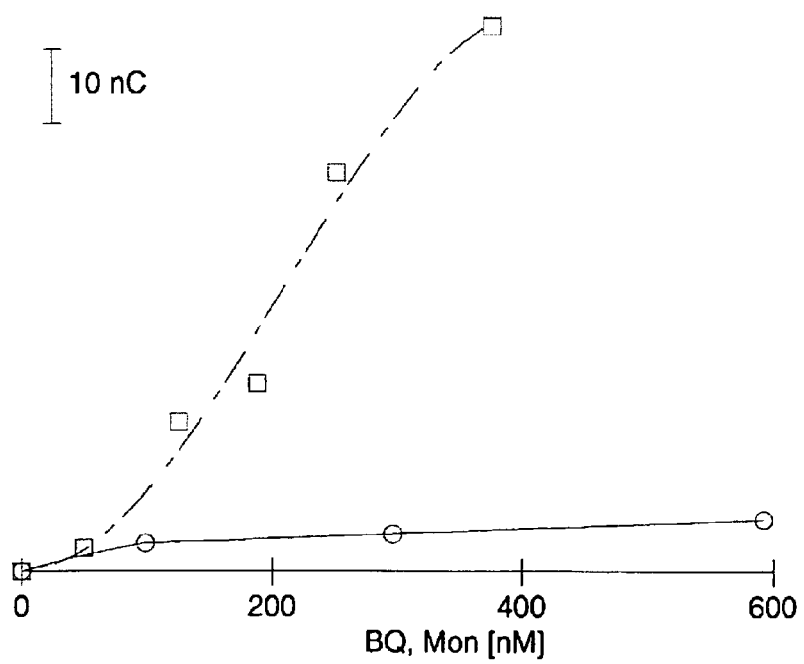
FIG. 8B shows the average charge measured from cyclic voltammograms of polymerized vesicles containing varying concentrations of benzoquinone at 1 mM $K_3Fe(CN)_6$.

Electron-mediated transport in IPEV systems as a function of mediator concentration—(For detailed methods refer to Examples 4b & 5b). Similar electrochemistry as shown in Example 5b was observed for IPEV systems containing various amounts of BQ and monensin. FIG. 8B (dashed line, □) displays a non-linear relationship with respect to charge transfer from electron-mediated IPEV systems as a function of increasing BQ/monensin concentration. Measured charge transfer was calculated from the area under the anodic wave. Charge transport was ineffective at low BQ/monensin concentration (<50 nM), whereas charge transport at relatively higher BQ/monensin concentration (>50 nM) increased electron exchange between vesicle-entrapped $Fe(CN)_6^{3-/4-}$ and the electrode. A maximum ("plateau") for total charge transferred was not observed since electrons can be transferred directly to BQ. In FIG. 8B (solid line, ○), control experiments were conducted to address the electrochemical activity of BQ/monensin in the absence of $Fe(CN)6^{3-}$. Plotting measured average faradaic charge as a function of BQ/monensin concentration in the presence of immobilized polymerized vesicles containing only water gives a slope of 0.005 nC/nM. This supports the assertion of electron mediated transport for IPEV systems.

EXAMPLE 6a

Nanobattery—Film preparation—A schematic prototype of the battery system is shown in FIG. 9. Gold thin films were deposited using an Edwards Auto306 thermal evaporator. Glass slides (1 cm$^2$), previously cleaned with acidic ethanol were rinsed with distilled water, dried with $N_2$, and then mounted in the vacuum chamber. Pressure was established at 10$^{-6}$ Torr prior to metal deposition. A precursor film of chromium metal (5 nm) was deposited onto the glass. Gold was deposited onto the precursor film to a thickness of 45 nm. Dimension of the slide were 2.54 cm×0.53 cm. The gold-coated area was 2.17 cm×0.53 cm (0.37 cm was non-coated, exposed glass).

Vesicle preparation—Dried 1-palmitoyl-2-(tricosa-10,12-diynoyl)-sn-glycero-3phosphocholine ($PC_{8,9}PC$) (25 mg) and N-3-(pyridyl-2-dithio)-propionyl-1-palmitoyl-2-(tricosa-10,12-diynoyl)-sn-glycero-3-phosphoethanolamine (PDP-$PC_{8,9}PE$) (1.04 mg) were redispersed in 5 mL of 10 mM $K_3Fe(CN)_6$ or 10 mM $K_4Fe(CN)_6$ and then probe-tip sonicated for 3 min (Branson Ultrasonics, Danbury, Conn.) followed by centrifugation to remove titanium particulates. Subsequent to the removal of extravesicular ferrocyanide or ferricyanide by anion exchange chromatography (Amberlite, Sigma), vesicles were rapidly cooled to 3.8° C. (10 s), then immediately photopolymerized by irradiation at 254 (3 min).

Vesicle deposition of anodic vesicles—To a 1 mL plastic cuvette, 750 μL of phosphate buffer (pH 7) and 250 μL of polymerized vesicles (previously desalted) similar to those made in Example 2b encapsulating 10 mM potassium ferrocyanide and 10 μL of 15 μM hydroquinone (dissolved in ethanol) were added to the cell. A thermally evaporated gold-coated glass slide was placed in this solution for 1 hr, protected from light and oxygen. Afterwards, the slide was thoroughly rinsed with distilled water and blown dry with nitrogen for subsequent electrochemical assembly.

Vesicle deposition of cathodic vesicles—To a 1 mL plastic cuvette, 750 μL of phosphate buffer (pH 7) and 250 μL of polymerized vesicles (previously desalted) similar to those made in Example 2b encapsulating 10 mM potassium ferricyanide and 10 μL of 150 μM benzoquinone (dissolved in ethanol) were added to the cell. A thermally evaporated gold-coated glass slide was placed in this solution for 1 hr, protected from light and oxygen. Afterwards, the slide was thoroughly rinsed with distilled water and blown dry with nitrogen for subsequent electrochemical assembly.

Electrode assembly for galvanic operation—Two vesicle-coated Au films were placed separately on top of a clear 4 mL plastic cuvette, affixed with double-sided scotch tape. The physical separation between the anodic and cathodic plate was 2.7 cm. These electrodes were placed in a Faraday cage, whereby the working electrode was clamped on the cathodic vesicle plate and the reference and counter electrode were clamped to the anodic vesicle plate. A salt bridge prepared from filter paper (90 mm, Whatman) dipped in 0.1 M KCl was immediately placed on top of the two-cell galvanic system. Precautions were taken for appropriate grounding of the electrode attachments (i.e., clamps) and static from the operator. Electrochemical measurements (open circuit potential and chronopotentiometry) were acquired using an Epsilon EC potentiostat (Bioanalytical Systems, Lafayette, Id.). Measurements were taken using IUPAC convention typically at nanoamp (nA) levels for 5 min. For the example galvanic/battery system recorded below (see FIG. 5), the current draw was 1 nA, and the input setting for data acquisition using the Bioanalytical Systems' software (Epsilon2000-XP version 1.40) was −1 nA (signifying reduction at the working electrode).

Figure 5:
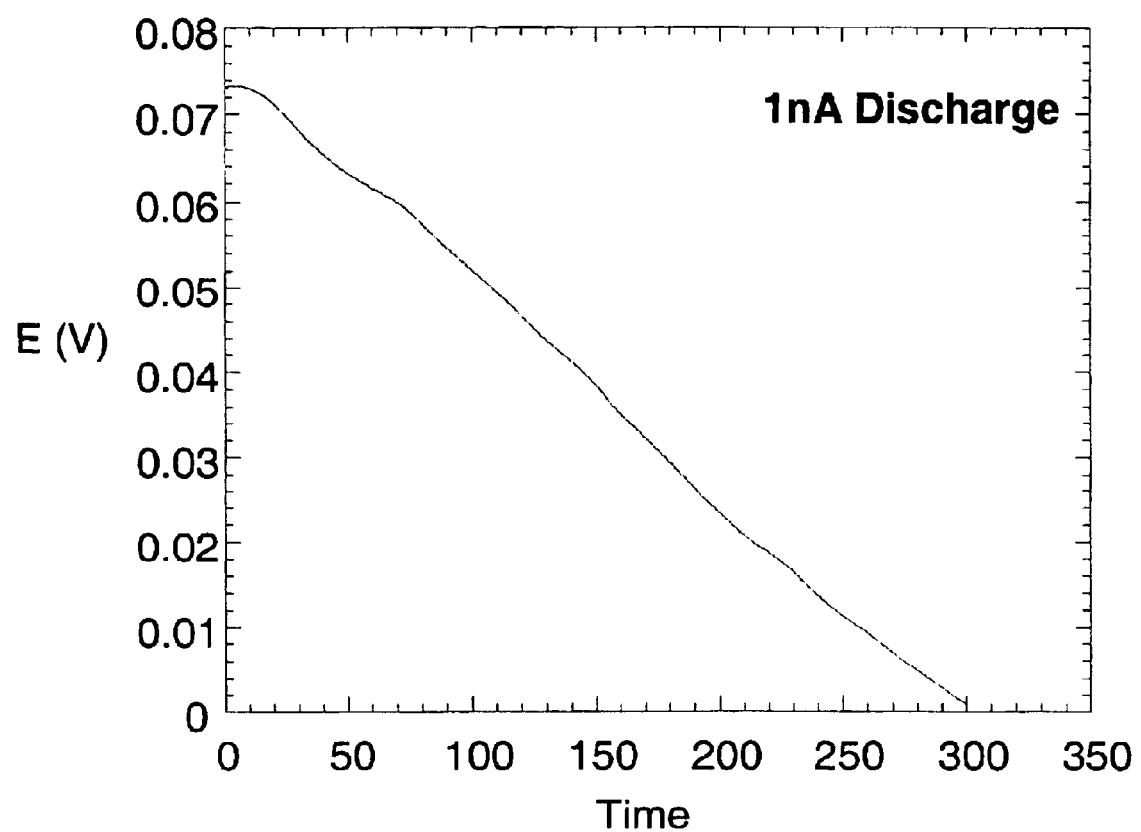
FIG. 5 shows the current draw at 1 nA from immobilized polymerized electroactive vesicles encapsulating 10 mM ferrocyanide and 10 mM ferricyanide and embedding within the membrane hydroquinone and benzoquinone, respectively at the anodic and cathodic plate.

FIG. 5 demonstrates the working principle of generating power from a vesicle-based system. The current draw was 1 nA and the maximum operating voltage was +0.075 V; therefore, the maximum power that can be achieved is 75 pW. The system lifetime for continuous discharge at 1 nA was 300 s; therefore the amount of charge passed was 300 nC, which translates, in battery terminology, to 83 pA-hr. This example battery system was designed to operate electrochemically in the pico-scale regime. Structurally, these vesicles were in the nanoscale-regime. Note that increasing the concentration of encapsulant and membrane-bound electron mediator can increase the system energy and power densities, respectively. The actual working area of the battery is dependent on the coverage of the salt bridge, which was 1.1 cm×0.635 cm=0.699 cm$^2$ per plate; the total area was 2×0.699 cm$^2$=1.397 cm$^2$. The power density is typically written per surface area, which corresponded to 54 pW/cm$^2$. The energy density was 59 pA-hr/cm$^2$. However, if written per volume, the power density was 6.75 μW/cm$^3$.

EXAMPLE 6b

Nanobattery: Electric Power Generated from coupled IPEV systems—(For detail methods refer to Examples 4b, 5b, 5c.) Electrical power was generated from coupled IPEV (CIPEV) systems. A schematic prototype of the battery system is shown in FIG. 9. The left IPEV plate encapsulated 10 mM $Fe(CN)_6^{4-}$ and the right 10 mM $Fe(CN)_6^{3-}$ whereby electrical neutrality was maintained via a salt bridge containing saturated KCl. As in Examples 5b and 5c, electron exchange between the encapsulant and the gold electrode was achieved by using the membrane soluble electron mediator, benzoquinone. Electrons flowed from the anode (the left plate) through a load, such as a miniaturized light emitting diode (LED), and terminated at the cathode (the right plate). Using a potentiostat (Bioanalytical Systems Inc., Lafayette, Id.), chronopotentiometry (CP) was employed to acquire current-voltage data. With a constant current draw of 1 nA, the voltage was monitored over time. At a peak operating voltage of 0.015 V, the maximum power generated was 0.015 nW (1 nA×0.015 V). The operating voltage measured was derived from the potential difference established between the left and right plate, which was dependent on the interfacial electroactivity of the hydroquinone/benzoquinone redox couple. The current decayed over time as governed by the characteristic transport rate of the electron mediator. For this CIPEV system, discharge was complete within 5 min at a constant current drain rate of 1 nA.

Obviously, many modifications and variations of the present invention are possible in light of the above teachings. It is therefore to be understood that the claimed invention may be practiced otherwise than as specifically described.

We claim:

1. A galvanic cell comprising:
   a cathode comprising;
      a first vesicle;
      an electron acceptor species encapsulated into the first vesicle;
      a first conducting substrate; and
      a first functionalized tether immobilizing the first vesicle to the first substrate;
   an anode comprising;
      a second vesicle;
      an electron donor species encapsulated into the second vesicle;
      a second conducting substrate; and
      a second functionalized tether immobilizing the second vesicle to the second substrate; and
   an electrolyte in contact with both the first conducting substrate and the second conducting substrate wherein the electrolyte comprises a salt bridge;
      wherein the first vesicle, the second vesicle, or both comprise one or more compounds selected from the group consisting of benzoquinone and hydroquinone.

2. The galvanic cell of claim 1, wherein the first vesicle, the second vesicle, or both comprise a material selected from the group consisting of phospholipid, quaternary amine surfactant, and vesicle-forming amphiphile.

3. The galvanic cell of claim 1, wherein the first vesicle, the second vesicle, or both comprise phospholipids having an ether, ester, or amide-linked backbone.

4. The galvanic cell of claim 1, wherein the first vesicle, the second vesicle, or both comprise phospholipids having polymerizable functionality.

5. The galvanic cell of claim 4, wherein the polymerizable functionality is located in the head-group, tail, or interfacial region of the phospholipid and is selected from the group consisting of vinyl, acetylenic, methacryl, acryl, styryl, diacetylenic, sulfhydryl, disulfide, and dienoates.

6. The galvanic cell of claim 4, wherein the first vesicle, the second vesicle, or both are polymerized.

7. The galvanic cell of claim 1, wherein the electron donor species is selected from the group consisting of riboflavin, ascorbic acid, and ferrocyanide.

8. The galvanic cell of claim 1, wherein the electron acceptor species is selected from the group consisting of ferricyanide, superferrioxide, ferri chelates, and manganese chelates.

9. The galvanic cell of claim 1, wherein the electron acceptor species comprises a metal ion coordinated with a chelating agent.

10. The galvanic cell of claim 9, wherein the chelating agent is selected from the group consisting of glutamate, ethylenediamine tetraacetic acid, and citrate.

11. The galvanic cell of claim 1, wherein the first vesicle, the second vesicle, or both comprise an electron mediator.

12. The galvanic cell of claim 11, wherein the electron mediator is selected from the group consisting of benzoquinone, vitamin K, ubiquinone, anthroquinone, ferrocene, and caroviolegen.

13. The galvanic cell of claim 1, wherein the first vesicle, the second vesicle, or both comprise an organic cationic carrier.

14. The galvanic cell of claim 13, wherein the organic cationic carrier is selected from the group consisting of nigericin, monensin, gramicidin, lasalocid, calcimycin, and ionomycin.

15. The galvanic cell of claim 1, wherein the first conducting substrate, the second conducting substrate, or both comprise a material selected from the group consisting of metal, polymer, and alloy.

16. The galvanic cell of claim 1, wherein the first conducting substrate, the second conducting substrate, or both comprise a material selected from the group consisting of gold, silver, palladium, platinum, rhodium, tin, polypyrrole, polyaniline, and indium titanium oxide.

17. The galvanic cell of claim 1, wherein the first conducting substrate, the second conducting substrate, or both comprise gold.

18. The galvanic cell of claim 1, wherein the first functionalized tether, the second functionalized tether, or both comprise saturated aliphatic.

19. The galvanic cell of claim 18, wherein the saturated aliphatic tether is selected from the group consisting of ethyl, propyl, butyl, pentyl, and hexyl.

20. The galvanic cell of claim 1, wherein the first functionalized tether, the second functionalized tether, or both comprise a functionality selected from the group consisting of conjugated polyene, non-conjugated polyene, polyacetylene, and polyphenylacetylene.

21. The galvanic cell of claim 1, wherein the first functionalized tether, the second functionalized tether, or both comprise a terminal functional group capable of binding to the first conducting substrate, the second conducting substrate, or both.

22. The galvanic cell of claim 21, wherein the terminal functional group is a coupling species selected from the group consisting of sulfhydryl, disulfide, amide, ester, and isocyanate.

23. The galvanic cell of claim 1, further comprising a fluorescent dye electrically connected to the first conducting substrate and the second conducting substrate.

24. A device comprising two or more of the galvanic cells of claim 1, wherein the cells are connected in parallel.

25. A device comprising two or more of the galvanic cells of claim 1, wherein the cells are connected in series.

26. A device comprising three or more of the galvanic cells of claim 1, wherein the cells are connected in series and parallel.

* * * * *

UNITED STATES PATENT AND TRADEMARK OFFICE
CERTIFICATE OF CORRECTION

PATENT NO. : 6,994,934 B2
DATED : February 7, 2006
INVENTOR(S) : Ivan Stanish et al.

It is certified that error appears in the above-identified patent and that said Letters Patent is hereby corrected as shown below:

<u>Title page,</u>
Item [75], Inventors, add -- Daniel A. Lowy, Woodbridge, VA (US) --.

Signed and Sealed this

Eighteenth Day of April, 2006

JON W. DUDAS
*Director of the United States Patent and Trademark Office*